United States Patent [19]
Panettieri

[11] 3,783,211
[45] *Jan. 1, 1974

[54] SAFETY IMPACT SWITCH DEVICE FOR MOTOR VEHICLES

[76] Inventor: Pietro Panettieri, Taunton, Mass.

[ * ] Notice: The portion of the term of this patent subsequent to Feb. 22, 1989, has been disclaimed.

[22] Filed: Aug. 5, 1971

[21] Appl. No.: 169,408

[52] U.S. Cl. .................. 200/61.50, 307/10 R
[51] Int. Cl. ............................................ H01h 35/14
[58] Field of Search .................................................
200/61.45–61.53; 307/10 R

[56] References Cited
UNITED STATES PATENTS

| | | | |
|---|---|---|---|
| 2,013,924 | 9/1935 | Nolte | 200/61.51 X |
| 2,142,369 | 1/1939 | Muller | 200/61.5 |
| 2,243,566 | 5/1941 | Kimball | 200/153 LB |
| 2,596,427 | 5/1952 | Nordmark et al. | 200/61.51 |
| 2,804,515 | 8/1957 | Heggen | 200/61.46 |
| 3,283,105 | 11/1966 | Locke et al. | 200/166 SD |
| 3,644,690 | 5/1970 | Panettieri | 200/61.5 |

Primary Examiner—Robert K. Schaefer
Assistant Examiner—M. Ginsburg
Attorney—Harold E. Cole

[57] ABSTRACT

A safety impact switch device is normally connected to the ignition system of a motor vehicle and is automatically disconnected by force of an impact resulting from a vehicle collision the disconnection being effected by movement of a comparatively heavy article connected to a contact member. The switch device is combined with reset apparatus, and one side of a housing provides the basic support for the mounting members that support the actuating mechanism of my device.

6 Claims, 5 Drawing Figures

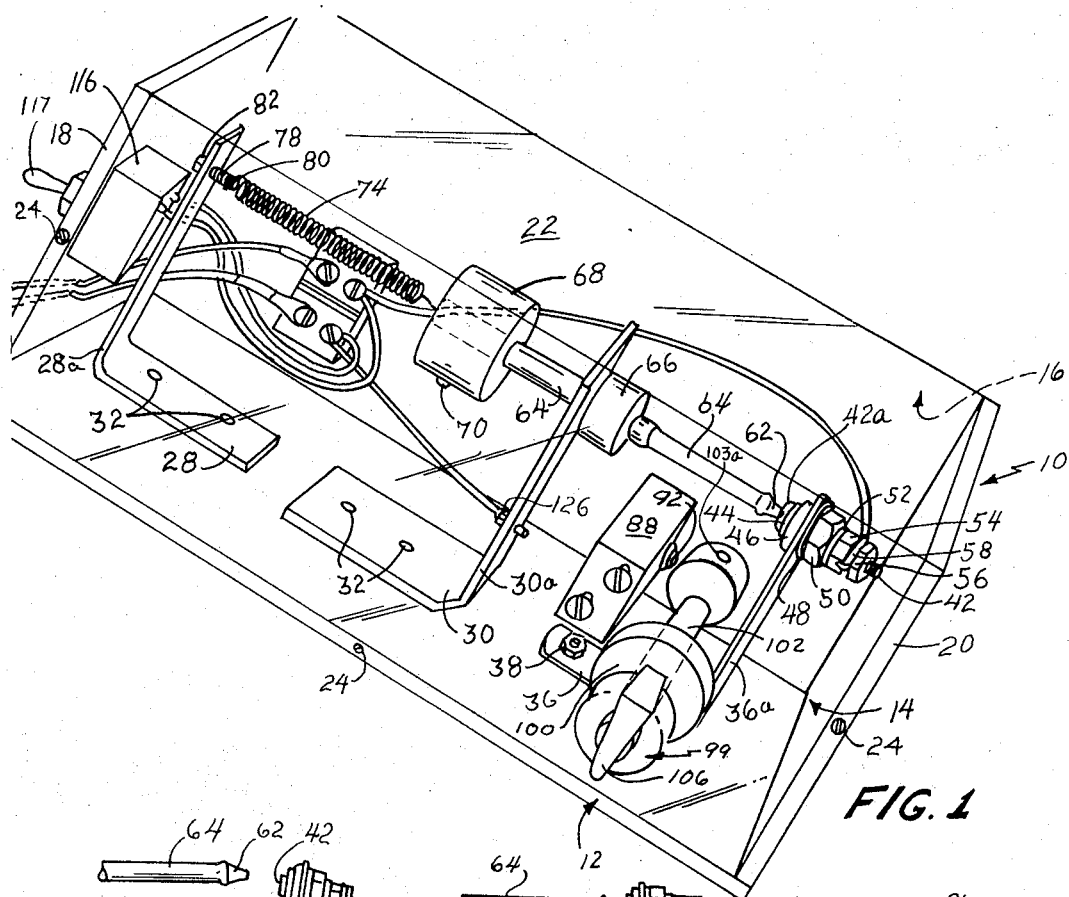
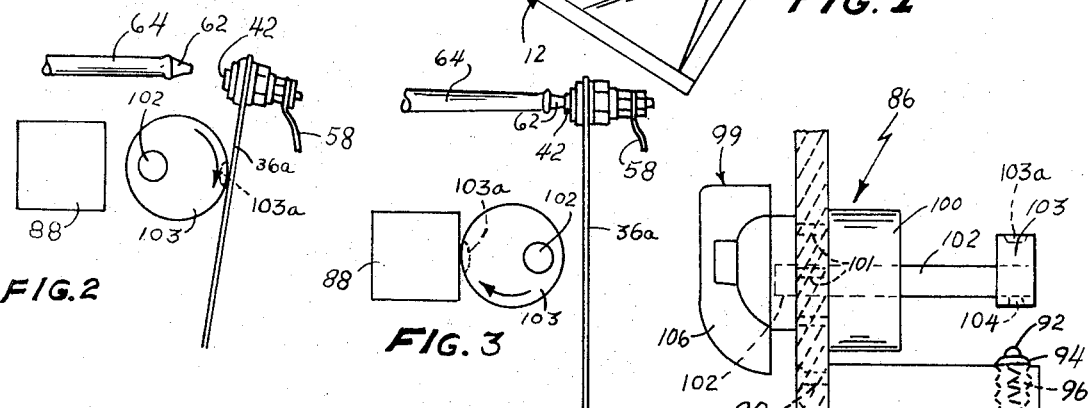
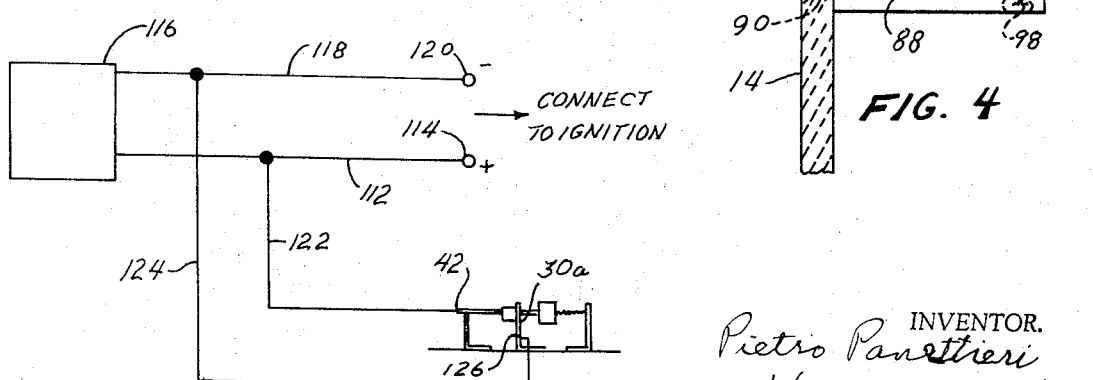

SAFETY IMPACT SWITCH DEVICE FOR MOTOR VEHICLES

The principal object of my invention is to simplify such a device by using fewer parts that can effect automatic electrical disconnection, and that also provide a reset mechanism to enable one to restore the electrical connection.

Reference is made to my U.S. Pat. No. 3,644,690 dated Feb. 22, 1972 for Safety Switch To Interrupt An Electrical Circuit In Case Of Collision.

In the drawing:

FIG. 1 is a perspective view of my switch apparatus showing the contact members engaged.

FIG. 2 is a diagrammatic view showing the contact members in open position, so held by a cam that is part of reset mechanism.

FIG. 3 is a diagrammatic view similar to FIG. 2, but showing the contact members engaged and the cam spaced from a resilient supporting extension on which a contact member is mounted.

FIG. 4 is a fragmentary, bottom plan view of the reset mechanism for my device.

FIG. 5 is a wiring diagram of the electrical circuit for my device.

As illustrated, my device has a housing or main support in the form of a receptacle 10 having six sides identified as a bottom 12, a front 14, a back 16, two ends 18 and 20, and a top 22. Screws 24 hold said sides and top together.

Mounting means for my mechanism includes two angular brackets 28 and 30 that are attached to said bottom 12 by screws 32. Supporting extensions 28a and 30a of said brackets 28 and 30 are in said housing. A third angular bracket 36 is bolted as at 38 to said bottom 12 and it has a resilient, supporting extension 36a within said housing. Thus, said bottom 12 is the basic support for my device.

Supported by said supporting extension 36a is first contact mechanism having a contact member 42 shown as a screw that extends through extension 36a and is connected to the latter by attaching means that includes an insulator ring 44 around said contact members 42 and next to a head 42a of the latter. Next to said ring 44 is a retaining member 46 that bears on said extension 36a. On the opposite side of the latter is an insulator ring 48 against which a retaining nut 50 bears. Another insulator ring 52 bears against a retaining nut 54 that is spaced from a similar nut 56. A conductor 58 wire is firmly held between said nuts 54 and 56. Said latter nuts screw-threadedly connect with said contact member 42.

Directly opposite said contact member 42 in position of use is other contact mechanism having a contact member 62 which includes an elongate portion 64 that continues in the form of a bearing member 66 that bears against said bracket supporting extension 30a and is pivotally movable therein. Said elongate portion 64 continues through said supporting extension 30a and a weight 68 is mounted thereon, being held by a set screw 70 which makes it possible to adjust the position of the weight on said elongate portion 64.

A coil spring 74 is attached at one end to the terminus or end of said contact member portion 64. At its opposite end said spring 74 is attached to a screw 78 by entering a hole 80 therethrough, which screw extends through and connects with a screw-threaded hole in said supporting extension 28a. Said screw 78 is held in predetermined position by a nut 82 thereon that bears against said extension 28a.

In order to hold said weight 68 under some tension said screw 78 is positioned in said extension 28a so as to keep said spring 74 tense. Thus a slight impact to a vehicle carrying my device will not cause disturbance of said weight sufficient to draw said contact member 62 apart from contact member 42, whereas a substantial impact will.

Reset apparatus 86 is mounted on said housing front 14, to which a block 88 held by screws 90 is attached. A retaining member 92 shown as a movable ball protrudes from said block, being movably retained in position by a collar 94 around it that bears on said block.

An actuating spring 96 extends into said block and is held against said retaining ball 92 by a screw 98. Actuating means has a circular mounting 100 that is held by screws 101 that enter said front 14. A shaft 102 extends at one end through said mounting 100 into a cam 103 having a recess 103a, and that is eccentrically mounted on said shaft, being held by a set screw 104. The opposite end of said shaft extends through said front 14 and is fixed in a handle 106 that is outside of said front 14.

A suitable electrical circuit is shown in said FIG. 5. Normally electrical current flows from a source of supply, not shown, through a conductor wire 112 held by a retainer 114 which wire 112 extends to one side of a well-known switch 116 having its box inside the housing, and a button 117 outside thereof. A return wire 118 held by a retainer 120 extends to another side of said switch 116. Another wire 122 extends from wire 112 to said contact member 42. Also, a wire 124 extends from said wire 118 to a ground clip 126 on said supporting extension 30a. In the event the contact between members 42 and 62 is broken, as in an automobile collision, any current reaching said wire 118 will be grounded.

Normally said contact members 42 and 62 are in contact and said supporting extension 36a is under sufficient tension to press said contact 42 so as to contact said member 62. Said cam 103 normally bears against said ball 92 and is spaced from said extension 36a.

When said weight 68 is upset, as by the impact of a collision, said contact members 42 and 62 are separated, thus breaking the circuit. To restore said contact members to engaging position said handle 106 is rotated until said cam bears against said extension 36a thus moving said contact member 42 away from said member 62; but to a position directly opposite the latter. Then upon rotating said handle 106 and moving said cam 103 to normal position where it bears against said ball 92 upon entering said recess 103a, said extension 36a is freed and it causes said contact member 42 to contact said member 62, thus restoring the electrical circuit.

Should it be desired to avoid use of my device said switch button is moved to off position which by-passes my device.

Since changes may be made in the above device without departing from the scope of the invention herein involved, it is intended that all matter contained in the above description or shown in the accompanying drawing shall be interpreted as illustrative and not in a limiting sense.

What I claim is:

1. A safety impact switch device for use on motor vehicles, comprising a housing, a first and a second angular bracket attached to said housing each having a supporting extension within the interior of said housing, a third angular bracket attached to said housing having a resilient supporting extension within the interior of said housing, first contact mechanism supported by said resilient supporting extension and having a first contact member, second contact mechanism supported by said second bracket supporting extension having a second contact member normally directly opposite and contacting said first contact member, a weight connected to said second contact mechanism that is susceptible to predetermined shock and is adapted to react therefrom by movement to separate said two contact members from normal position, spring means attached to said weight and supported by said first bracket extension, and conducting means attached to one of said contact members adapted to normally establish an electrical circuit through said contact members when the latter are in normal position.

2. A safety impact switch device as of claim 1, and reset apparatus attached to said housing at a point spaced from and angularly to said three brackets, and having a cam, a shaft attached to said cam and extending outside of said housing, said cam being eccentrically mounted on said shaft and so positioned that it is spaced from said resilient, supporting extension normally, but upon movement bears against said latter extension and is adapted to move the latter and said first contact member to a point spaced from said second contact member.

3. A safety impact switch device as of claim 1, said second contact mechanism having an elongate portion, said weight being adjustably mounted on said elongate portion, and a screw extending into said weight and normally bearing on said elongate portion to adjustably hold said weight in predetermined position thereon.

4. A safety impact switch device as of claim 2, and a block mounted on said housing, a retaining member supported by said block and projecting beyond and normally contacting said cam to thereby hold said reset apparatus in predetermined position.

5. A safety impact switch device as of claim 2, and a handle fixedly attached to said cam shaft and being outside of said housing.

6. A safety impact switch device as of claim 1, said housing having two oppositely disposed ends, a switch and a box therefor attached to one of said housing ends and extending into the interior thereof, said switch being connected to said conducting means, and a switch button connected to said switch and being outside of said housing and extending through said latter housing end.

* * * * *